Figure 1:
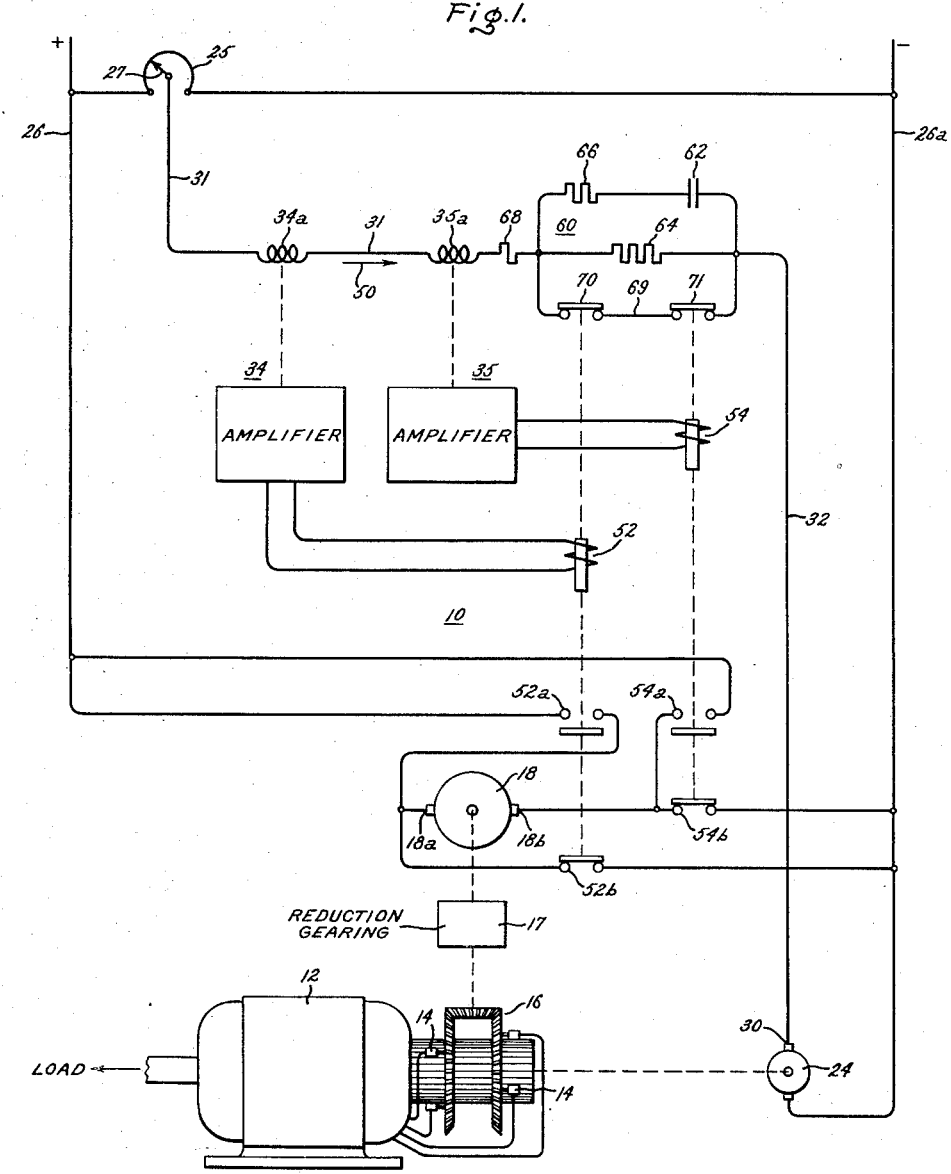

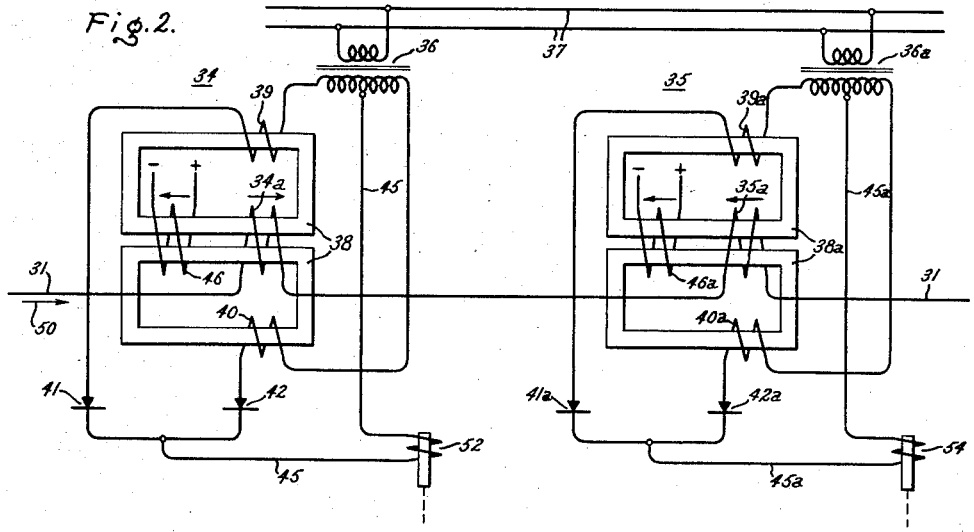
Fig.2.
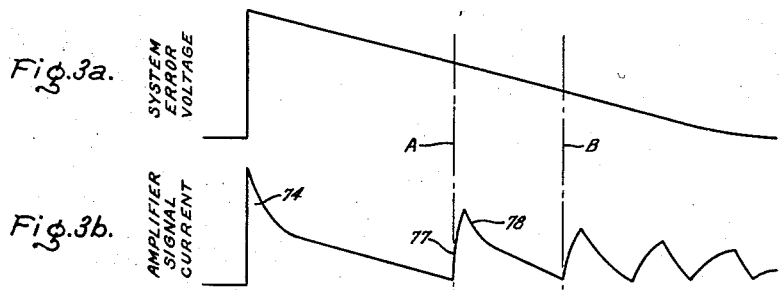
Fig.3a. SYSTEM ERROR VOLTAGE
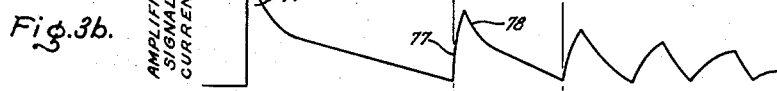
Fig.3b. AMPLIFIER SIGNAL CURRENT
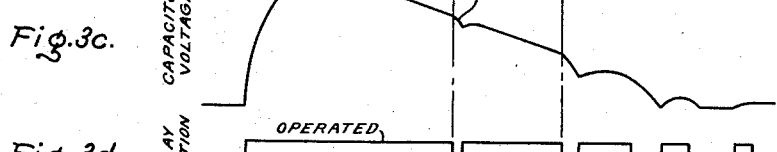
Fig.3c. CAPACITOR VOLTAGE
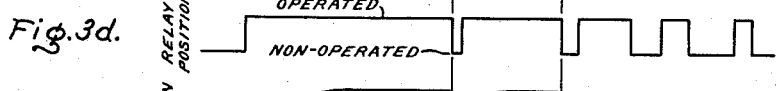
Fig.3d. RELAY POSITION
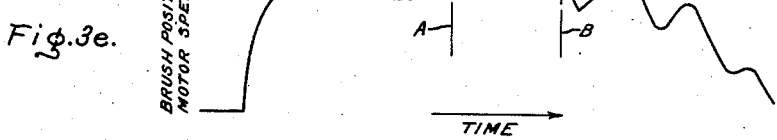
Fig.3e. BRUSH POSITION MOTOR SPEED
Inventor:
Warren W. Bolander,
by J Wesley Haubner
His Attorney.

United States Patent Office 2,859,397
Patented Nov. 4, 1958

2,859,397

FEEDBACK TYPE CONTROL SYSTEM

Warren W. Bolander, Scotia, N. Y., assignor to General Electric Company, a corporation of New York Application December 28, 1955, Serial No. 555,818

5 Claims. (Cl. 318—448)

This invention relates to an automatic control system and, more particularly, to the feedback type of automatic control system in which a regulated quantity is maintained in agreement with a reference quantity by means of an error-correcting device which operates in response to a difference between the two quantities.

As a general rule, the simplest and least expensive form of such control systems is the "on-off" type of control system. As the name implies, such a system typically includes an error-correcting device which has its operation controlled by a two-position, or two-condition, controller, which in one position or condition supplies full power to the error-correcting device and in its other position or condition supplies no power to the error-correcting device. While such systems are desirably characterized by a relatively high speed of response, they are subject to the disadvantage that the error-correcting device, operating at high speed, will tend to unduly overcorrect the regulated quantity and thus produce appreciable "hunting," i. e., oscillation of the regulated quantity about the desired value. This tendency to overcorrect can be reduced by widening the deadband of the system, i. e., by rendering the system insensitive within a relatively wide band to deviations of the regulated quantity from the value desired; but such an approach, of course, decreases the accuracy of the system.

These disadvantages can be overcome to a considerable extent by using a proportional type of control system, e. g., a system in which the controller for the error-correcting device has an infinite number of positions through which it can be moved smoothly to produce corrective action as a direct function of the deviation, or magnitude of error. This type of control system, due to its relatively low rate of correction at the time the regulated quantity approaches the desired value, tends to produce considerably less over-correction than the "on-off" type of system, but is subject to the disadvantage that its cost is relatively high.

Accordingly, it is an object of my invention to provide a new and improved control system which retains the simplicity of the "on-off" type of control system but yet possesses many of the desirable characteristics of a proportional type system.

Another object of my invention is to provide an on-off type of control system in which for large system errors corrective action takes place at a high rate, but as the error is reduced, the rate of correction is likewise reduced.

Another object is to achieve correction at a reduced rate as the system error is reduced by modulating the effective time interval during which power is supplied to the error-correcting device in accordance with the magnitude of the system error.

In carrying out my invention in one form, I provide a feedback type of control system which includes means for comparing a reference quantity with a regulated quantity and for deriving an error voltage having a magnitude representative of the difference between the compared quantities, and an error-correcting device operable upon energization to adjust the regulated quantity in a direction to reduce the difference between the compared quantities. The correcting device is cyclically energized and deenergized by the action of an on-off type controller, such as a relay, and produces corrective action at average rates dependent upon the total duration of the energizing intervals per representative unit of time. Means responsive to the magnitude of the error voltage is provided for causing the controller to energize the error-correcting device for energizing intervals having a total duration per unit of representative time which generally decreases as the error quantity decreases, thus reducing the rate of correction as the error quantity is reduced. This means comprises a parallel combination of a capacitor and a resistor. The error voltage is applied to this combination to produce a current which causes the controller to establish a shunt path around the parallel combination when the correcting device is deenergized and interrupts the shunt path when the correcting device is energized.

For a better understanding of my invention, reference may be had to the following specification taken in connection with the accompanying drawings, wherein: Fig. 1 is a schematic illustration of a preferred form of control system embodying my invention. Fig. 2 is a more detailed schematic illustration of a portion of the system of Fig. 1, and Figs. 3a to 3e are graphical representations of certain quantities during a period of system correction.

Referring now to Fig. 1, the illustrated control system 10 is used, by way of example, for regulating the speed of an adjustable speed electric motor 12, which is utilized for driving a suitable load. This motor 12 can be of any suitable adjustable speed type, but for illustrative purposes I have chosen an alternating current motor of the well-known shiftable brush type. This type of motor typically comprises a set of brushes 14 which can be shifted relative to each other and to the motor stator to adjust the speed of the motor. For shifting or changing the position of the brushes, the motor 12 is provided with a suitable brush positioning mechanism schematically shown at 16. This mechanism 16 is arranged to be driven through suitable reduction gearing 17 by a small reversible direct-current motor 18, frequently termed hereinafter the error-correcting or brush-positioning motor. This brush-positioning motor 18 has a suitable field (not shown) which preferably is continuously excited from a suitable source of unidirectional voltage.

Since the construction of shiftable-brush motors and brush positioning mechanisms, such as referred to above, is well known in the art and one particular form of each is shown in U. S. Reissue Patent No. 14,031, Schrage, and U. S. Patent No. 1,778,599, Hull, the constructional details of these components have not been shown in the drawing.

The speed of the motor 12 is measured by means of a conventional tachometer generator 24 which develops across its terminals a unidirectional voltage which is proportional to the speed of the motor 12.

For providing a reference voltage which is indicative of the speed at which it is desired to operate the motor 12, I provide a potentiometer resistor 25, which is shown connected across a suitable source of unidirectional control voltage comprising a positive bus 26 and a negative bus 26a. The potentiometer has a slider 27 which can be adjusted to provide the desired reference voltage between the slider and the negative terminal of the potentiometer. For comparing this reference voltage with the tachometer voltage so as to provide an error voltage which is representative of the difference between the actual and the desired speed of the motor 12, I connect the reference voltage source in voltage-opposing relationship with the tachometer generator. To this end, the slider 27 is connected to the positive terminal 30 of the tachometer generator by means of a circuit generally indicated by the reference numerals 31, 32, whereas the negative terminals of the potentiometer and the tachometer generator are connected to the negative bus 26a.

For sensing the presence of an error voltage, I have provided a pair of suitable amplifiers 34 and 35, preferably of the self-saturating magnetic type. Each of these amplifiers, or "amplistats," as they are sometimes called, has an input, or control, winding 34a or 35a connected in the circuit 31, 32 so as to be energized by signal current produced by the error voltage. The amplistats can be of any suitable form but should differ from each other in the manner in which each responds to signal current of a predetermined polarity. For example, in the illustrated embodiment, the amplifier 34, preferably, should be so constructed that its output varies as a direct function of signal current flowing from the slider 27 toward the terminal 30 of the tachometer generator but as an inverse function of signal current of opposite polarity. Conversely, the other amplifier 35, preferably, should be so constructed that its output varies as inverse function of signal current flowing from the slider 27 toward the generator terminal 30 but as a direct function of signal current of opposite polarity.

Fig. 2 schematically illustrates the particular type of amplistat construction which I prefer to use for providing the desired response on the part of the amplistats. The amplistat 34 of Fig. 2 comprises a center-tapped power transformer 36 having its primary connected across a suitable source 37 of alternating current; a pair of saturable cores 38, each with its own load winding (39 or 40) connected respectively to an opposite terminal of the transformer; and a pair of rectifiers 41 and 42, one in series with load winding 39 and the other in series with load winding 40. The load, which in the case of amplistat 34 is the coil of a relay 52, is connected in an output circuit 45 extending between the center tap of the transformer and the junction point between the rectifiers 41 and 42. The input or control winding 34a links both saturable cores.

The rectifiers 41 and 42 permit current to flow through their respective load windings 39 and 40 only during alternate half cycles. The current through load winding 39 saturates the associated core 38 on one half cycle and the current through the winding 40 saturates the other core on the next half cycle. The time during each half cycle at which saturation occurs is governed by the action of the control winding 34a in affecting the initial partial saturation of the cores. This initial partial saturation which is relatively small is produced by a conventional negative bias winding 46 continuously energized from a suitable source of unidirectional current. The time during each half cycle at which saturation occurs, in turn, governs the output current flowing in the output circuit 45, such output current being the sum of the average currents through the two load windings. The earlier that saturation occurs during each half, the greater will be the output current.

The amplistat 35 is essentially the same as the above-described amplistat 34 with the exception of the manner in which the control winding of each amplistat is linked to its saturable cores. More specifically, in the amplistat 34 the control winding 34a is linked to its cores in such a manner that signal current flowing through the circuit 31 in the direction of the arrow 50 produces flux in the cores which opposes the negative bias flux and tends to increase the initial partial saturation of the cores. The opposing relationship of the magneto motive forces of windings 46 and 34a is indicated by oppositely directed arrows adjacent these windings. In the other amplistat 35 the control winding 35a is linked to its cores in such a manner that current flowing in the direction of arrow 50 produces flux which is in the same direction as the negative bias and tends to decrease the initial partial saturation of its cores. This cumulative relationship of the magneto motive forces of the windings 46a and 35a is indicated by arrows adjacent the windings pointed in the same direction. As a result, this signal current (in the direction of arrow 50) causes the cores of amplistat 34 to saturate at an earlier point in each half cycle, thus increasing the output of amplistat 34, and causes the cores of amplistat 35 to saturate at a later point in each half cycle, thus decreasing the output of amplistat 35. Signal current flowing in an opposite direction will produce opposite results, i. e., increase the output of amplistat 35 but decrease the output of amplistat 34.

The output of the amplistat 34 is utilized for controlling the operation of an "on-off" type of controller, e. g., switching means such as the relay 52, which, in turn, is utilized for controlling the operation of the brush-positioning or error-correcting motor 18 in a direction to increase the speed of the main motor 12. The output of amplistat 35 is utilized for controlling the operation of a second "on-off" type of controller such as a relay 54, which in turn, is utilized for controlling the operation of the brush positioning motor 18 in a direction to decrease the speed of the main motor 12. In view of their respective functions, the relays 52 and 54 can be conveniently termed the "up relay" and the "down relay," respectively, whereas the amplistats 34 and 35 can be conveniently termed the "up amplistat" and the "down amplistat," respectively.

When the up relay 52 is operated, it produces operation of the brush positioning motor 18 in the desired speed-increasing direction by closing its normally-open contacts 52a and opening its normally-closed contacts 52b. This completes for the motor 18 an energizing circuit which extends from the positive bus 26, through the then-closed contacts 52a, through the armature of the motor 18 (from terminal 18a to 18b), and then through the normally-closed contacts 54b of the down relay to the negative bus 26a. When the down relay 54 is operated, it produces operation of the brush positioning motor 18 in the desired opposite, or speed-decreasing, direction by closing its normally-open contacts 54a and opening its normally-closed contacts 54b. This completes for the motor 18 an energizing circuit which extends in an opposite direction through the motor armature to that previously-described, thus producing motor operation in an opposite, or speed-decreasing, direction. Specifically, this speed-decreasing energizing circuit for the motor 18 extends from the positive bus 26, through the then-closed contacts 54a, through the armature of the motor 18 (from terminal 18b to 18a), and then through the contacts 52b to the negative bus 26a. Although the motor 18 has a separately-excited field (not shown) as previously described, it is considered to be effectively deenergized when its armature circuit is open as shown in Fig. 1.

As thus far described, the control system operates in the following manner: Assume that the main motor 12 is operating at a first predetermined speed and that it is desired to increase this speed to a second predetermined value. The slider 27 would be adjusted to provide an increased reference voltage indicative of the desired increased speed, and this would create a difference between the newly-selected reference voltage and the tachometer voltage. This difference, or error voltage, would produce a signal current which would flow in a direction 50 in the circuit 31. In response to such a signal current, the output of down amplifier 35 would decrease as previously-described, but the output of the up amplifier 34 would quickly rise to effect operation of the up relay 52. Operation of the up relay 52 would cause the motor 18 to operate to shift the brushes 14 in the speed increasing direction, thus increasing the speed of the motor 12. This increased motor speed would be reflected in increased output voltage for the tachometer generator 24 and a resultant decrease in error voltage. The speed of the motor 12 would continue to increase until this error voltage was reduced to a value insufficient to produce continued operation of the relay 52, at which point the motor speed would have reached approximately the desired value.

Speed reduction to a predetermined desired value is achieved in a corresponding but opposite manner. More particularly, by shifting the slider 27 in an opposite direction, an error voltage is produced which causes signal current to flow in an opposite direction to the arrow 50, thus causing the down amplistat 35 to produce operation of the down relay 54. This down relay 54 causes the motor 18 to shift the brushes in the speed-decreasing direction, thus decreasing the speed of the motor 12. This speed would continue to decrease until the error voltage was reduced to a value insufficient to produce continued operation of the relay 54, at which point the motor speed would have reached approximately the desired value.

In order to materially lessen the tendency of the described control system to over-correct in the manner typical of "on-off" type control systems, I have devised a time-modulating circuit 60 which is capable of causing the correcting motor 18 to operate at a reduced rate as the error voltage is reduced. This time-modulating circuit 60, as shown in Fig. 1, is connected in series with the circuit 31, 32 and comprises a timing capacitor 62 connected in parallel with a resistor 64. An additional resistor 66 is connected in parallel with the first resistor 64 and in series with the capacitor 62. Still another resistor 68, hereinafter termed the dead band adjustor, is connected in series with the parallel combination. The resistor 64 should be large with respect to both the resistors 66 and 68. By way of example, in one particular application of this circuit, I have obtained highly satisfactory results by using a resistor 64 having a resistance of 10,000 ohms, a resistor 66 of 930 ohms, a resistor 68 of 250 ohms, and a capacitor 62 of 200 microfarads. These values, however, are merely representative of one set of desirable values, and it will be apparent to those skilled in the art that these values can be considerably modified without departing from the true spirit of my invention. The time-modulating circuit 60 further comprises a circuit 69 which at the instant illustrated in the drawing shunts the parallel combination of the capacitor 62 and the resistor 64. For reasons which will soon appear more clearly, the up relay 52 is provided with contacts 70 for making and breaking this shunt circuit 69, and likewise the down relay 54 is provided with a corresponding set of contacts 71 also for making and breaking this shunt circuit 69. Preferably, this shunt circuit 69 has negligible impedance.

The manner in which the circuit 60 controls the operation of the amplifiers 34 and 35 and hence the correcting motor 18 should be apparent from the following description taken in connection with Figs. 1 and 3. Assume first that it is desired to increase the speed of the motor from a first to a second value and that the slider 27 is suddenly adjusted to provide an increased reference voltage representative of the desired increased speed. This adjustment of slider 27 would immediately create a difference between the newly-selected reference voltage and the tachometer voltage, the difference being an error voltage which would be applied across the series combination of the amplistat input windings 34a, 35a, and the time modulating circuit 60. This error voltage, which is graphically depicted in diagram (a) of Fig. 3, immediately causes signal current to flow through the circuits 31, 69, 32 in the direction of arrow 50 and thus would cause the output of the up amplistat 34 to suddenly increase to produce operation of the up relay 52. This relay operation is illustrated in the diagram (d) of Fig. 3 near the left hand end of the diagram. This operation of the up-relay 52 would initiate operation of the correcting motor 18 in the proper error correcting direction as indicated in Fig. 3(e), and would also open the normally-effective shunt path 69. Opening this shunt path 69 would insert the capacitor 62 in circuit with the signal current, and the capacitor 62 would quickly charge to almost the entire error voltage since the resistance 64 is large compared to resistance 68. This voltage build-up across the capacitor is illustrated in Fig. 3c. The capacitor charging current produces an initial peak in the signal current as shown at 74 in curve (b) of Fig. 3.

The up relay 52 would remain in its operated position to maintain the error-correcting motor 18 energized and operating at top speed until the motor 18 had reduced the error voltage to a value insufficient to maintain the up relay in operated position. At this time, which is indicated at A in Fig. 3, the up relay 52 drops out to close its contacts 70, thereby reestablishing the shunt path 69.

Reestablishing this shunt path 69 has two important effects. First, it causes the capacitor 62 to begin discharging through the resistor 66, as indicated by the relatively steep drop in capacitor voltage shown at 76 in Fig. 3(c). Secondly, it effectively removes from the circuit 31, 32 a major portion of the circuit resistance in the form of resistor 64, thereby producing an abrupt increase in the signal current flowing in circuit 31. This increasing signal current, which is indicated at 77 in Fig. 3b, increases the output of amplistat 34 sufficiently to again operate the up relay 52, thus effectively energizing the correcting motor 18 once again. The relay 52 would drop out immediately after pick-up if it were not for the capacitor 62. This capacitor 62, then being partially discharged, is in a condition to receive additional charging current. Such charging current adds to the otherwise-present signal current to produce a total signal current (as shown at 78 in Fig. 3(b)) which is sufficiently high to maintain the relay 52 in its operated position during the capacitor-charging interval. As the capacitor 62 becomes fully charged, the charging current and therefore the signal current decreases to drop out the relay 52 at a time B, thus completing a cycle of operations, which cycle may be considered as extending from time A to time B. As illustrated in Fig. 3, this cycling will continue in the same manner, though the relay remains operated for progressively shorter intervals and non-operated for progressively longer intervals until the brush positioning motor 18 has adjusted the speed of the main motor 12 to such a value that there is insufficient error voltage to produce any further operations of the relay 52.

From Fig. 3(e) it can be seen that as the error voltage decreases, the average motor speed for each succeeding operational cycle correspondingly decreases. The motor 18, though energized from a constant voltage source, is operated at successively lower average speeds as a result of the decreasing duration of the motor-energizing intervals and the increasing duration of the intervals during which it remains deenergized. Thus, it will be apparent that the relay 52, as controlled by the circuit 69, modulates the effective time interval during which power is supplied to the motor 18 in accordance with the magnitude of the system error. It will also be apparent that the motor 18 is sensitive to the total duration of the motor-energizing intervals per representative unit of time and operates at average speeds which decrease as such total duration decreases. As is evident from Fig. 3(d), this total duration per representative unit of time, generally decreases as the error voltage decreases, thus causing the average speed of the correcting motor 18 for each successive cycle generally to decrease as the error voltage decreases. By the term "a representative unit of time" is meant a unit of time long enough to include an appreciable period measured from the start of a cycle during which the relay is in both operated and non-operated positions, for example, the time required for an average single cycle of operations during the multi-cycle corrective operation illustrated in Fig. 3.

Although I have specifically described only a speed-increasing operation, it will be apparent to those versed in the art that the system operates in a corresponding manner for a speed-decreasing operation.

Though the disclosed control system is of the "on-off" type, its performance approaches that of a proportional type system in that maximum corrective effort is provided for large system errors and reduced corrective effort is provided as the system error is reduced. I have found that a system using the time-modulating circuit 60 of my invention has a much higher degree of accuracy than a corresponding on-off system without the circuit. Specifically, I have found that my modulating circuit enables the system dead band width to be reduced to one-fourth of that required by a corresponding system without the circuit.

The number of cycles, or corrective steps, which the system will effect in a given period of time can be controlled by the size of the timing capacitor 62 selected. The size of this capacitor can be varied to provide a coarse adjustment of the number of steps, whereas the size of the series resistor 66 can be varied to provide a fine control of the number of steps. The resistor 64 controls the amount of system error present before time modulation commences, whereas the resistor 68 can be suitably varied to adjust the dead band of the system. The fact that these important characteristics of the system can be so easily adjusted contributes in an important manner to the high degree of flexibility which the system possesses.

While I have shown my invention embodied in a preferred form of control system which is utilized for regulating speed, it will be apparent to those skilled in the art that certain features of the invention are equally applicable to control systems for regulating other quantities, such as position, temperature, voltage, etc. It will also be apparent that certain features of my invention are equally applicable to control systems wherein the error-correcting device is controlled by an on-off type controller other than a relay, for example, those systems which use two-position valves or which use high-speed electronic switching means for controlling the error-correcting device. Likewise, certain features of the invention are equally applicable to control systems which utilize error-correcting devices other than the electric motor shown, e. g., those systems which utilize fluid motors or which utilize heat generators for producing corrective action.

Other such modifications will suggest themselves to those skilled in the art. Therefore, it should be understood that I intend by the appended claims to cover all such modifications and changes as fall within the true spirit and scope of my invention.

What I claim as new and desire to secure by Letters Patents of the United States is:

1. In a feedback type of control system comprising a main electric motor, a source of reference voltage representative of a desired speed of said motor, means for deriving from said motor a voltage representative of its speed, a voltage-comparison circuit for comparing said reference voltage and speed voltage to provide an error voltage representative of the difference between the speed of said motor and the desired speed, a correcting motor operable upon energization to adjust the speed of said main motor in such a manner as to reduce said error voltage, on-off type controller means for intermittently producing effective energization of said correcting motor to effect corrective action at average rates dependent on the duration and spacing of the energizing intervals, and means comprising a resistance-capacitance time modulating circuit responsive to the magnitude of said error voltage for causing said controller means to produce energizing intervals having a total duration per representative unit of time which generally decreases as the error voltage decreases.

2. In a feedback type of control system comprising means for comparing a reference quantity with a regulated quantity and for deriving an error voltage having a magnitude representative of the difference between the compared quantities, correcting means operable upon energization to adjust the regulated quantity in such a manner as to reduce said error voltage, controller means for cyclically producing effective energization and deenergization of said correcting means to cause said correcting means to produce corrective action at average rates dependent upon the total duration of the energizing intervals per representative unit of time, an amplifier having an input element and a power output dependent upon the current supplied to said input element, means for operating said controller means from said amplifier output, and amplifier control means for causing said controller means to produce energizing intervals having a total duration per representative unit of time which generally decreases as said error voltage decreases, said amplifier control means comprising the parallel combination of a capacitor and a resistor connected in series with said input element, means for applying said error voltage to the series combination of said input element and said parallel combination thus supplying to said input element current dependent upon said error voltage, and means responsive to the operation of said controller means for establishing a shunt path in series with said input element and around said parallel combination when said correcting means is deenergized and for opening said shunt path when said correcting means is energized.

3. In a feedback type of control system comprising means for comparing a reference quantity with a regulated quantity and for deriving an error voltage having a magnitude representative of the difference between the compared quantities, a correcting motor operable upon energization to adjust the regulated quantity in such a manner as to reduce said error voltage, switching means for cyclically producing effective energization and deenergization of said correcting motor to cause the motor to operate at average speeds dependent upon the total duration of the motor-energizing intervals per representative unit of time, an amplifier having an input element and a power output dependent upon the current supplied to said input element, means for operating said switching means from said amplifier output, and amplifier control means for causing said switching means to produce motor-energizing intervals having a total duration per representative unit of time which generally decreases as said error voltage decreases, said amplifier control means comprising the parallel combination of a capacitor and a resistor connected in series with said input element, means for applying said error voltage to the series combination of said input element and said parallel combination thus supplying to said input element current dependent upon said error voltage, means for establishing a shunt path in series with said input element and around said parallel combination in response to reduction of said error voltage to a value which produces effective deenergization of said motor thereby discharging said capacitor and increasing the current supplied to said input element to a value sufficient to produce reenergization of said motor, and means responsive to the production of motor reenergization for opening said shunt path to cause said error voltage to charge said capacitor with current supplied to said input element whereby to extend the motor-energizing interval.

4. In a feedback type of control system comprising means for comparing a reference quantity with a regulated quantity and for deriving an error voltage having a magnitude representative of the difference between the compared quantities, correcting means operable upon energization to adjust the regulated quantity in such a manner as to reduce said error voltage, controller means for cyclically producing effective energization and deenergization of said correcting means to cause said correcting means to produce corrective action at average rates dependent upon the total duration of the motor-energizing intervals per representative unit of time, an amplifier having an input element and a power output dependent upon the current supplied to said input element, means for operating said controller means from said amplifier output, and amplifier control means for causing said controller means to produce motor-energizing intervals having a total duration per representative unit of time which generally decreases as said error voltage decreases, said amplifier control means comprising the parallel combination of a capacitor and an impedance connected in series with said input element, means for applying said error voltage to the series combination of said input element and said parallel combination thus supplying to said input element current dependent upon said error voltage, and means for establishing a shunt path in series with said input element and around said parallel combination in response to reduction of said error voltage to a valve which produces deenergization of said correcting means, establishment of the shunt path acting to produce reenergization of said correcting means, and means for extending the interval during which said correcting means is reenergized comprising means responsive to said reenergizing action for opening said shunt path.

5. In a feedback type of automatic control system comprising means for comparing a reference quantity with a regulated quantity and for deriving an error voltage having a magnitude representative of the difference between the compared quantities, correcting means operable upon energization to adjust the regulated quantity in such a manner as to reduce the error voltage, on-off type controller means for intermittently producing effective energization of said correcting means to cause said correcting means to produce corrective action at average rates dependent upon the duration and spacing of the energizing intervals, an amplifier having an input element and a power output dependent upon the current supplied to said input element, means for operating said controller means from said amplifier output, and amplifier control means for causing said controller means to produce energizing intervals varying in duration and spacing in such a manner as to cause said correcting means to produce corrective action at successively lower average rates as said error voltage is reduced, said amplifier control means comprising the parallel combination of a capacitor and a resistor connected in series with said input element, means for applying said error voltage to the series combination of said input element and said parallel combination thus supplying to said input element current dependent upon said error voltage, and means responsive to the operation of said controller means for establishing a shunt path in series with said input element and around said parallel combination when said correcting means is deenergized and for opening said shunt path when said correcting means is energized.

References Cited in the file of this patent

UNITED STATES PATENTS

| | | |
|---|---|---|
| 2,115,086 | Riggs | Apr. 26, 1938 |
| 2,203,472 | Schmidt | June 4, 1940 |
| 2,513,537 | Williams | July 4, 1950 |
| 2,534,801 | Siltamaki | Dec. 19, 1950 |
| 2,701,328 | Woodruff | Feb. 1, 1955 |